United States Patent [19]

Connon et al.

[11] 4,004,699
[45] Jan. 25, 1977

[54] METHOD AND APPARATUS FOR DISCHARGE HANDLING OF METAL SHEETS

[75] Inventors: Frederick Louis Connon, Erieau; John Neil Stone, Kingsville, both of Canada

[73] Assignee: David Krofchak Limited, Cambridge, Canada

[22] Filed: July 9, 1975

[21] Appl. No.: 594,390

[30] Foreign Application Priority Data

May 29, 1975 Canada .................. 228413

[52] U.S. Cl. .................. 214/6 C; 214/6 S; 214/152
[51] Int. Cl.² .................. B65G 57/28
[58] Field of Search .......... 214/1 S, 6 C, 6 S, 7, 214/309, 310, 152; 271/210, 220, 221; 294/67 R, 67 E; 266/38, 39

[56] References Cited

UNITED STATES PATENTS

| | | | |
|---|---|---|---|
| 1,753,933 | 4/1930 | Lormor | 214/7 |
| 2,168,205 | 8/1939 | Harten et al. | 214/1 S X |
| 3,239,944 | 3/1966 | Gebert | 271/210 X |
| 3,418,725 | 12/1968 | Ruud | 271/210 X |
| 3,750,901 | 8/1973 | Melin | 214/6 S |
| 3,842,995 | 10/1974 | Dooley | 271/210 X |
| 3,902,609 | 9/1975 | Ohlsson | 214/6 C X |

Primary Examiner—L. J. Paperner
Attorney, Agent, or Firm—Frank I. Piper; Arne I. Fors; Robert F. Delbridge

[57] ABSTRACT

Apparatus for discharge handling metal sheets from a rack consists of a pair of tiltable tables, plan dimensioned to telescope inside the rack when the latter is lowered over the tables; each table has a vertically disposed stop and a vertically positioned member slidable towards the stop. A pull down for the rack ensures that the sheets which are supported by spaced apart pins are lowered sufficiently below the tables to free the sheets from the pins at which time the slidable members move each to their respective stop to pack the sheets. The tables are then tilted until the stops are horizontal and the slidable members retract after which the packs are moved off the tables on to adjacent loading stations.

9 Claims, 7 Drawing Figures

METHOD AND APPARATUS FOR DISCHARGE HANDLING OF METAL SHEETS

FIELD OF INVENTION

This invention relates to apparatus and method for handling a plurality of spaced apart metal sheets after they have been treated in a chemical bath and has particular application to the discharge handling of spaced apart steel sheets from a rack after they have been pickled to remove the scale formed during rolling.

PRIOR ART

Prior to pickling, steel sheets are loaded vertically on to a rack and maintained in a spaced apart position by upstanding pins. On removal from the pickling bath, and after washing, the sheets are unloaded by lowering the rack on to blocks on a shear conveyor table, the sheets being then held in place manually while the rack is further lowered and the top of the pins are below the level of the table.

The sheets are then allowed to fall whereby they rest partly on the conveyor table and partly on the rack. Further movement of the sheets for packing is then effected by pry bars and the rack is released for further use.

The above method is unsatisfactory for a number of reasons; the pack pins become bent requiring costly repairs, the sheets are bent and there is a danger of injury to the operators due to falling sheets.

SUMMARY OF THE INVENTION

It is an object of the invention to provide a method and apparatus for safely unloading and packing vertically disposed spaced apart sheets from a pickling rack.

The invention consists in lowering the pickling rack which supports the vertically disposed spaced apart sheets around and below a tiltable table, having a vertically disposed stop and slidable member thereon, to leave the sheets on the table, moving the slidable member against the sheets to pack them against the stop, tilting the table until the stop is substantially horizontal, retracting the slidable member and then moving the pack off the horizontally disposed stop to a loading station. In addition the invention contemplates clamping and lowering the rack below the table level to ensure that the sheets are free of the rack.

DESCRIPTION OF THE DRAWINGS

The invention will now be described in relation to the accompanying drawings in which.

DESCRIPTION OF AN EMBODIMENT OF THE INVENTION

Figure 1:
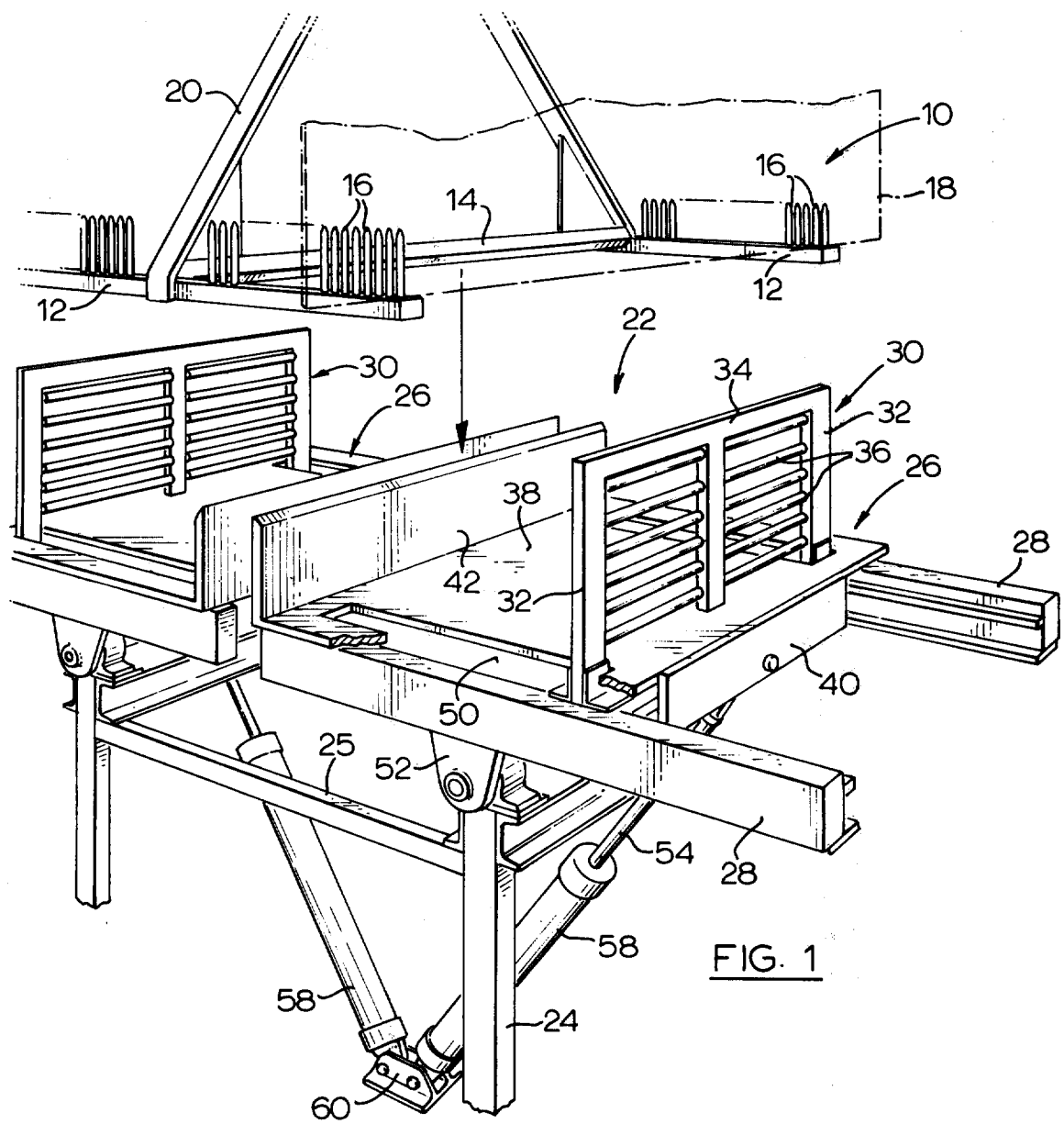
FIG. 1 is a perspective view of an embodiment of the invention showing a rack carrying metal sheets positioned above unloading apparatus which includes a tiltable table.

In the drawings like numbers represent like parts. The rack which is generally denoted by the number 10, see FIG. 1, is illustrated only to show that it includes a pair of horizontally disposed spaced apart arms 12 joined by cross arm 14; the arms 12 have a series of upstanding spaced apart pins 16 with the space between corresponding pins holding a metal sheet 18. Each arm 12 at its mid section has an upwardly disposed member 20 which converge to join each other and provide a support for lifting and lowering the rack 10 by means of a crane not shown.

Figure 7:
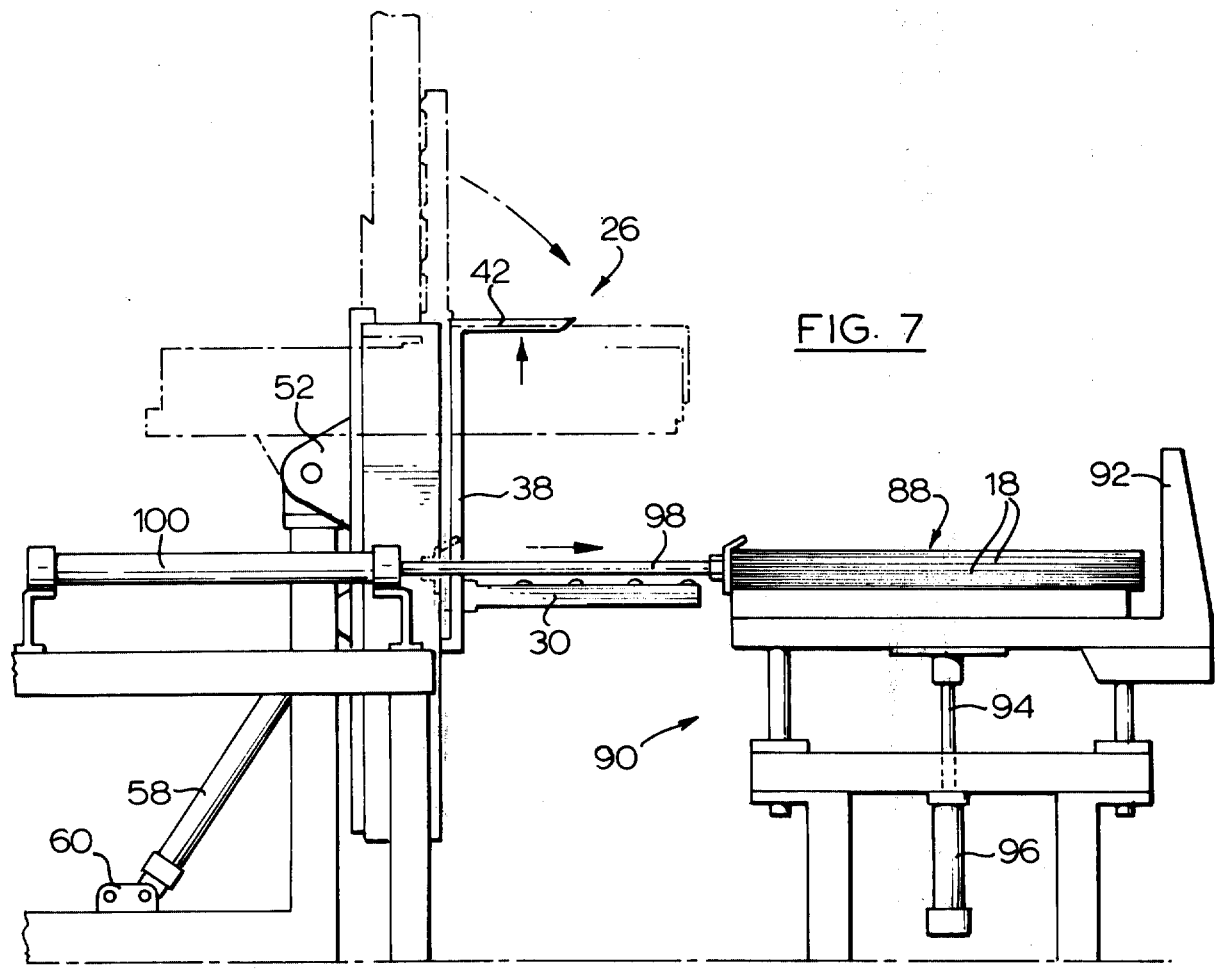
FIG. 7 illustrates the tilting of the table and removal of the pack sheets.

The rack 10 is shown in FIG. 1 above an unloading apparatus generally denoted by the numeral 22 which is supported on spaced apart uprights 24 connected by horizontally disposed members 25 to form a frame. The unloading apparatus 22 includes a pair of table structures 26, each of which is tiltable through an angle of 90° in opposite directions from their adjacent edges in the aligned position shown in FIG. 1 to the position shown in FIG. 7.

Each table structure 26 comprises a pair of spaced apart guide rails 28, see FIG. 1, to which is secured a vertically disposed stop, generally denoted by the number 30, consisting of spaced apart uprights 32 connected by a cross piece 34 and a series of horizontal free running rollers 36.

Slidably supported on the guide rails 28 is a plate 38 having at one end a downwardly depending plate 40 disposed between the guide rails 28. The other end of the plate 38 has an upwardly extending plate 42 disposed parallel to the stop 30. The free end of a piston 44 is secured to the plate 40 with the piston 44 extending under the plate 38 into a cooperating cylinder 46 secured to a cross member 48 in the table structure 26.

Figure 2:
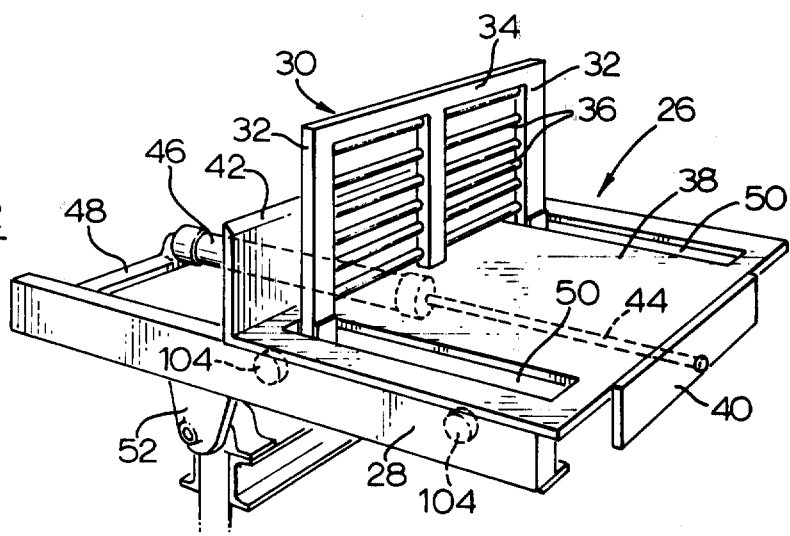
FIG. 2 illustrates the sliding mechanism for clamping the sheets into a pack.
Figure 4:
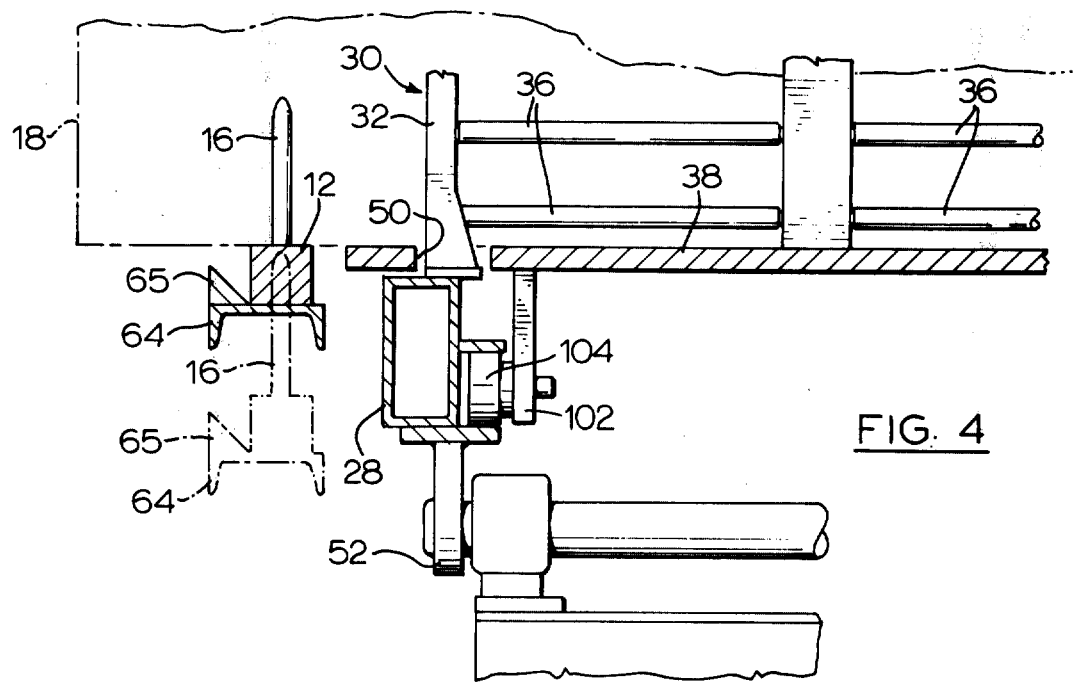

As illustrated in FIG. 2 the plate 42 is movable along the guide rails 28 towards the stop 30 through the action of the piston 44. Slots 50 are provided in the plate 38 to clear the uprights 32 when the plate 42 is moved towards the stop 30, as shown in FIG. 4 plate 38 is mounted on legs 102 which in turn carry rollers 104 contained within guide rails 28.

Figure 5:
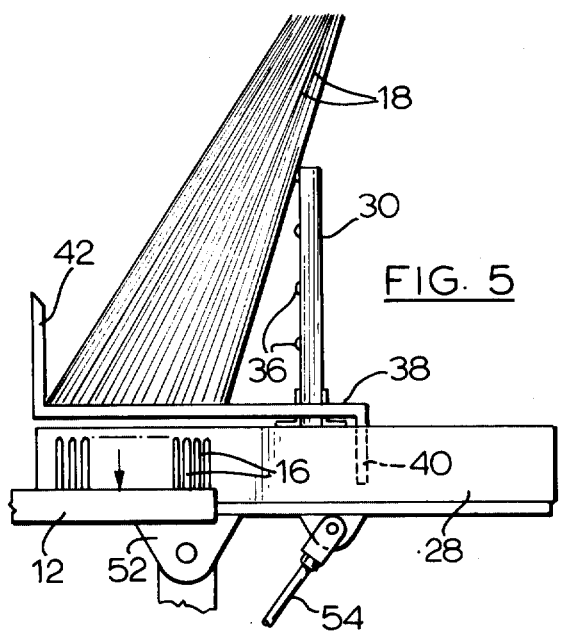
FIGS. 5 and 6 illustrate the clamping of the sheets to form a pack.
Figure 6:
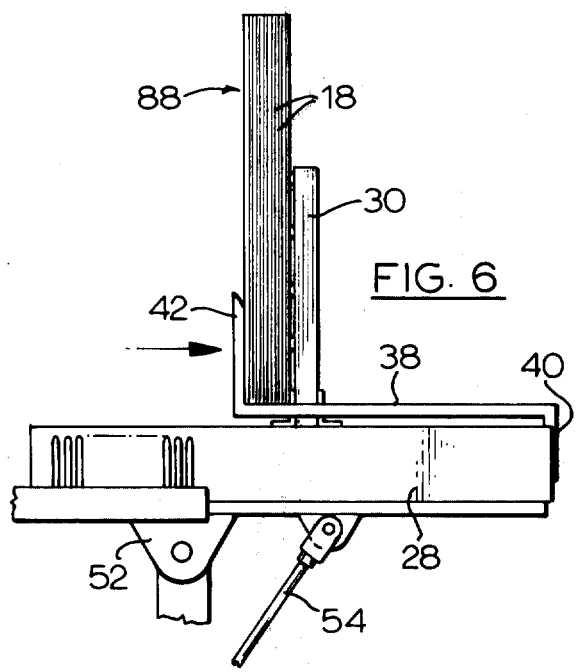

Each table structure 26 is pivotably supported on the uprights 24 by trunnions 52 and the pivotable action of the table structure 26 in opposite directions is controlled by an individual piston 54 secured to the underside of the table 26 at a position outward of the trunnion 52, as shown in FIGS. 5 and 6. Each piston 54 is activated through an individual cylinder 58 secured to a centrally positioned base support 60.

Figure 3:
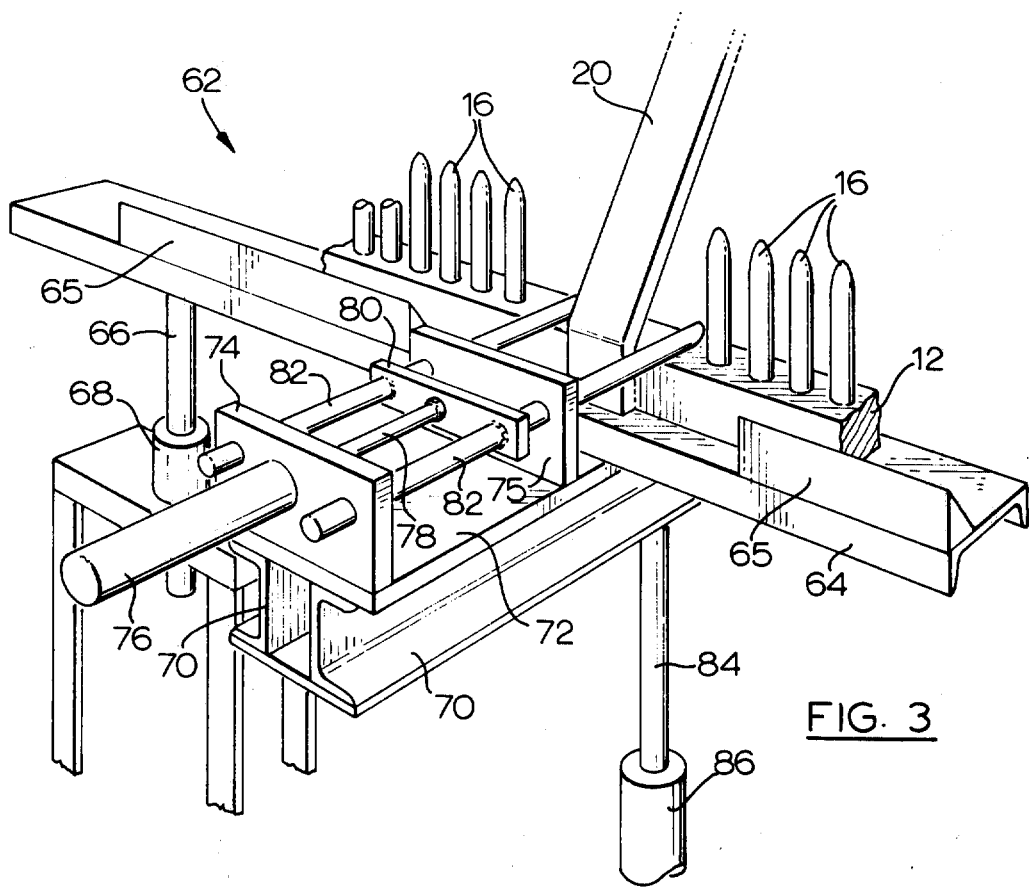
FIGS. 3 and 4 illustrate securement of the rack and its lowering below the level of the tiltable table to free the sheets from the rack.

To properly effect unloading of the sheets 18, the rack pins 16 must be lowered below the level of the table structure 26. A clamping apparatus generally denoted by the numeral 62 is used to ensure this result. One side only of the clamping apparatus 62 is shown in FIG. 3, the other side, not shown, being the same.

The apparatus 62 includes a beam 64 positioned outward of one pair of aligned guide rails 28 of the table structure 26. The beam 64 has a pair of spaced apart wedge shaped members 65 which act as a centering device for the rack 10 when it is lowered to surround the table structure 26. The beam 64 is supported on guides 66 each slidably located in an individual fixed bushing 68. A pair of I beams 70, are secured to the underside of the beam 64 and extend outward therefrom as shown in FIG. 3 to support a plate forming a platform 72. An upstanding plate 74 is secured to the platform 72 and the plate 74 supports a horizontally disposed cylinder 76 with a piston 78 extending therefrom in the direction of the rack 10.

The piston 78 terminates in a movable spacer plate 80 and a pair of rods 82 are secured to the spacer plate 80, one to each side of the piston 78. The outer end of each rod 82 is slidably located in the plate 74 and in the companion plate 75. The inner ends of the pair of rods 82 are extendible over the rack 10, as shown in FIG. 3, on activation of the piston 78.

One end of a vertically disposed piston 84 is secured to the underside of the I beams 70, the lower end of the piston 84 extending into a cooperating cylinder 86. When the rods 82 are extended over the rack 10, lowering of the piston 84 will cause the rods 82 to bear down on the rack and lower it to a level where the rack pins 16 are below the level of the table structures 26 thus ensuring release of the sheets 18.

At the same time the slidable plates 42 are moved on the tables 26 towards the individual stops 30 to form a pack 88 of sheets 18 as illustrated in respect of one table 26 in FIGS. 5 and 6. The tables 26 are then pivoted through 90 degrees until the stops 30 are horizontal, this position being ensured by contact of the outwardly extending portion of the guide rails 28 with the uprights 24. Each slidable plate 42 is then retracted from it's individual stop 30.

Adjacent each table 26 is a storage table 90 having a vertically disposed limit plate 92. The storage table 90 is adjustably movable in a vertical plane by means of a piston 94 and cooperating cylinder 96. The pack of sheets on each horizontally disposed stop 30 is moved on to the adjacent storage table 90 by means of a pusher arm 98 activated by a cylinder 100.

What we claim as new and desire to protect by Letters Patent of the United States is:

1. Apparatus for discharge handling of a plurality of sheets from a rack having means for supporting said sheets in a vertically disposed spaced apart position, consisting of a tiltable table, said sheet supporting means being large enough in plan dimensions to telescope over said table, means for telescopic lowering of said support means below said table to release said sheets onto said table, a vertically disposed stop on said table, an upstanding member on said table movable towards said stop on said release of the sheets to form a pack thereof against said stop, means for tilting said table, while said support means is below said table, until said stop with said pack is horizontal, and means for moving said pack from said horizontally disposed stop when said slidable member is moved away from said stop.

2. Apparatus according to claim 1 wherein said means for telescopic lowering comprises a beam engageable with the underside of said rack, retractable means extending over said beam and said rack, means for vertically lowering said beam when said retractable means extends over said beam and rack.

3. Apparatus according to claim 2 wherein said retractable means are a pair of spaced apart slidable rods supported on a platform outward of said rack, said platform being attached to said beam.

4. Apparatus according to claim 2 wherein said beam has a wedge shaped member to locate said rack for telescopic entry about said table.

5. Apparatus according to claim 1 having another tiltable table with a similar stop and slidable member, said tables being tiltable in opposite directions with said slidable members being movable away from each other towards their respected stops.

6. Apparatus according to claim 1 wherein said table is supported on a pair of spaced apart guide rails, a plate movable on said guide rails, said plate having slots to enable it to move past said stop, said slidable member being positioned on said movable plate.

7. Apparatus according to claim 1 wherein said stop has a plurality of free running rollers.

8. Apparatus according to claim 1 wherein a vertically movable storage table is positioned alongside said tiltable table to successively receive the packs from said horizontally disposed stop.

9. Method of discharge handling vertically spaced apart sheets from a rack through a tiltable table having a stop, said rack being large enough in plan dimensions to enable said table to telescope within it, comprising the steps of pulling said rack down over said table to a lower position to release said sheets, pressing said sheets against said stop to form a pack, tilting said table while said rack is in said lower position until said pack on said stop is substantially horizontal, releasing the pressure on said pack and removing said pack from said stop.

* * * * *